United States Patent
Shen (10) Patent No.: US 10,246,907 B2
(45) Date of Patent: Apr. 2, 2019

(54) SPINNING KNOB

(71) Applicant: KING ROOF INDUSTRIAL CO., LTD., Taichung (TW)

(72) Inventor: Shih-Chieh Shen, Taichung (TW)

(73) Assignee: KING ROOF INDUSTRIAL CO., LTD, Taichung (TW)

( * ) Notice: Subject to any disclaimer, the term of this patent is extended or adjusted under 35 U.S.C. 154(b) by 0 days.

(21) Appl. No.: 15/669,379

(22) Filed: Aug. 4, 2017

(65) Prior Publication Data

US 2019/0040656 A1    Feb. 7, 2019

(51) Int. Cl.
| | | |
|---|---|---|
| E05B 71/00 | (2006.01) | |
| F16B 37/14 | (2006.01) | |
| B60R 9/10 | (2006.01) | |
| F16M 13/02 | (2006.01) | |

(52) U.S. Cl.
CPC .............. *E05B 71/00* (2013.01); *F16B 37/14* (2013.01); *B60R 9/10* (2013.01); *F16M 13/02* (2013.01)

(58) Field of Classification Search
CPC ..... E05B 1/00; E05B 5/00; E05B 7/00; E05B 71/00; F16B 37/14; F16B 37/145; B60R 9/10; F16M 13/02
USPC ........... 16/414, 433, DIG. 30; 411/396, 910; 215/207; 220/210; 70/58, 158–173, 222, 70/223, 229–232, DIG. 57
See application file for complete search history.

(56) References Cited

U.S. PATENT DOCUMENTS

| | | | | | |
|---|---|---|---|---|---|
| 1,471,553 | A | * | 10/1923 | Fell ..................... | B60R 25/0222 70/221 |
| 1,530,521 | A | * | 3/1925 | Robinson .............. | F16B 41/005 224/42.25 |
| 1,870,427 | A | * | 8/1932 | Stallings ............... | F16B 41/005 70/231 |
| 2,467,087 | A | * | 4/1949 | Konchan ............ | B60K 15/0409 220/293 |
| 3,800,574 | A | * | 4/1974 | Reid .................... | B62D 43/007 70/231 |
| 3,807,204 | A | * | 4/1974 | Cucheran ................ | B60R 25/00 70/231 |
| 4,107,961 | A | * | 8/1978 | Evans ................ | B60K 15/0409 220/210 |
| 4,132,091 | A | * | 1/1979 | Aro .................... | B60K 15/0409 220/210 |

(Continued)

*Primary Examiner* — Lloyd A Gall
(74) *Attorney, Agent, or Firm* — Muncy, Geissler, Olds & Lowe, P.C.

(57) ABSTRACT

The spinning knob includes a shell, a rotation member, and a pushing member. The rotation member is rotatably disposed on the shell. The rotation member includes a threaded portion for screwing with a screw. The pushing member is arranged on the shell and tends to abut against the rotation member to have circumferential interference with the rotation member so that the shell and the rotation member may rotate simultaneously. When the rotation member is screwed to the screw sufficiently and an end of the rotation member abuts against an object, if the shell is further rotated, the rotation member obliquely abuts against the pushing member to make the pushing member trip away from the rotation member so that the pushing member has no circumferential interference with the rotation member and that the shell is rotatable with respect to the rotation member.

11 Claims, 7 Drawing Sheets

(56) References Cited

U.S. PATENT DOCUMENTS

| | | | | |
|---|---|---|---|---|
| 4,231,240 A * | 11/1980 | Fujita | ............... | B60K 15/0409 |
| | | | | 220/210 |
| 4,280,347 A * | 7/1981 | Evans | ............... | B60K 15/0409 |
| | | | | 220/210 |
| 4,342,208 A * | 8/1982 | Evans | ............... | B60K 15/0409 |
| | | | | 220/210 |
| 4,362,035 A * | 12/1982 | Vitale | ................... | E05B 13/101 |
| | | | | 217/107 |
| 4,527,406 A * | 7/1985 | Baker | ............... | B60K 15/0409 |
| | | | | 220/210 |
| 4,794,768 A * | 1/1989 | Moser | ............... | B60K 15/0409 |
| | | | | 70/165 |
| 4,809,869 A * | 3/1989 | Cosgrove | ........... | B60K 15/0406 |
| | | | | 220/288 |
| 4,875,819 A * | 10/1989 | Wilkinson | ............ | F16B 41/005 |
| | | | | 411/432 |
| 4,984,698 A * | 1/1991 | Stuckey | ................. | B65D 55/14 |
| | | | | 215/207 |
| 5,904,057 A * | 5/1999 | Abney | ............... | B60K 15/0409 |
| | | | | 220/203.26 |
| 6,223,923 B1 * | 5/2001 | Fishman | ............ | B60K 15/0409 |
| | | | | 220/203.22 |
| 7,520,709 B2 * | 4/2009 | Wang | .................... | F16B 41/005 |
| | | | | 411/396 |
| 7,624,889 B2 * | 12/2009 | Tharp | ................ | B60K 15/0406 |
| | | | | 220/210 |
| 2007/0169524 A1 * | 7/2007 | Tharp | ................ | B60K 15/0406 |
| | | | | 70/172 |

\* cited by examiner

SPINNING KNOB

BACKGROUND OF THE INVENTION

Field of the Invention

The present invention relates to a spinning knob.

Description of the Prior Art

Conventionally, a knob screwed on a screw is used for fastening an object. The knob is moved toward the object and abuts against the object for fastening by rotating the knob. On the contrary, the object is released when the knob is moved away from the object by rotating the knob. However, when the knob already abuts against the object, the knob cannot be rotated further. If the knob is forced to rotate, the threads of the knob or the screw may damage to make the knob nonfunctional.

SUMMARY OF THE INVENTION

The main object of the present invention is to provide a spinning knob

To achieve the above and other objects, the spinning knob of the present invention includes a shell, a rotation member, and a pushing member.

The rotation member defines an axial direction. The rotation member is rotatably disposed on the shell along the axial direction. The rotation member includes at least one threaded portion. The threaded portion is adapted for screwing with a screw.

The pushing member is arranged on the shell. The pushing member tends to abut against the rotation member to have circumferential interference with the rotation member so that the shell and the rotation member may rotate simultaneously.

When the rotation member is screwed to the screw sufficiently and an end of the rotation member abuts against an object, if the shell is further rotated, the rotation member obliquely abuts against the pushing member to make the pushing member trip away from the rotation member so that the pushing member has no circumferential interference with the rotation member and that the shell is rotatable with respect to the rotation member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 13, the spinning knob of the present invention includes a shell 1, a rotation member 2, and a pushing member 3.

The rotation member 2 defines an axial direction. The rotation member 2 is rotatably disposed on the shell 1 along the axial direction. The rotation member 2 includes at least one threaded portion 23 for screwing with a screw 91. In the present embodiment, the screw 91 is disposed on a bicycle carrier.

The pushing member 3 is disposed on the shell 1 and tends to abut against the rotation member 2 so that the pushing member 2 has circumferential interference with the rotation member 2 to make the shell 1 and the rotation member 2 rotate simultaneously.

When the rotation member 2 is screwed to the screw 91 sufficiently and an end of the rotation member 2 abuts against an object 92 (a clamp sleeved onto the screw in the present embodiment), the object 92 can be fastened. If the shell 1 is further rotated, the rotation member 2 obliquely abuts against the pushing member 3 to make the pushing member 3 trips away from the rotation member 2 so that the pushing member 3 has no circumferential interference with the rotation member 2 and that the shell 1 is rotatable with respect to the rotation member 2. Thus, the device spins to prevent the threaded portion 23 and the screw 91 from abrading to make it more durable.

As shown in FIG. 4 to FIG. 8, in the present embodiment, the rotation member 2 has a plurality of protrusions 27 extending radially. The pushing member 3 has circumferential interference with the rotation member 2 between two adjacent said protrusions 27. The pushing member 3 has an inclining face 32. When an end of the rotation member 2 abuts against the object 92 and the shell 1 is rotated continuously, one of the protrusions 27 abuts against the inclining face 32 to move the pushing member 3 away from the rotation member 2 so that the pushing member 3 has no circumferential interference with said protrusion 27.

Preferably, the spinning knob of the present invention further includes a seat 7. The seat 7 is fixed on the shell 1. The seat 7 has a sliding groove 71. The pushing member 3 is slidably disposed in the sliding groove 71.

The rotation member 2 has at least one restriction member 24 disposed on the rotation member 2 slidably along a radial direction. The restriction member 24 is movable between a screwing position and a release position. The restriction member 24 has the threaded portion 23. An elastic member 26 is disposed on one of the rotation member 2 and the shell 1 to push the restriction member 24 so that the restriction member 24 tends to move toward the screwing position to make the threaded portion 23 abut against and screw with the screw 91. When the restriction member 24 moves toward the release position, the threaded portion 23 does not abut against and screw with the screw 91. Thus, the rotation member 2 and the shell 1 can be moved quickly on the screw 91.

Specifically, in the present embodiment, the spinning knob of the present embodiment further includes at least one pressing member 4. The pressing member 4 is slidably disposed on the shell 1. The pressing member 4 corresponds to the restriction member 24. When the pressing member 4 is pressed toward the restriction member 24, the pressing member 4 pushes the restriction member 24 to the release position. Thus, the operation is easier by pressing the pressing member 4.

Preferably, the spinning knob of the present embodiment includes two said restriction member 24. Each of the restriction members 24 has a sleeve hole 25 to sleeve onto the screw 91. The threaded portion 23 is arranged on a side of an inner wall of the sleeve hole 25. The two restriction members 24 are aligned vertically and staggered. When each of the restriction members 24 moves toward the crew 91, the two threaded portion 23 abut against and screw with the screw 91. When each of the restriction members 24 moves away from the screw 91, the two threaded portions 23 do not abut against the screw 91.

Figure 1:
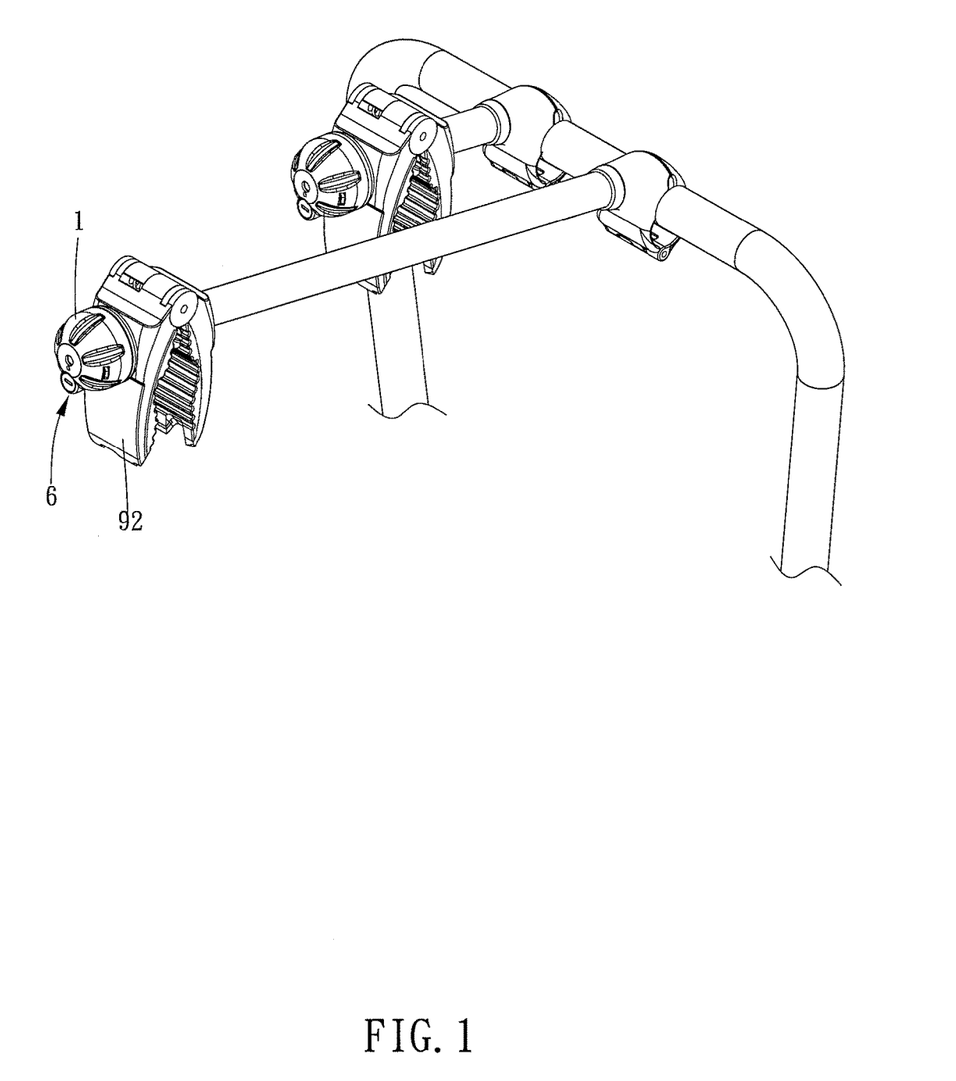
FIG. 1 is an illustration of the present invention.
Figure 2:
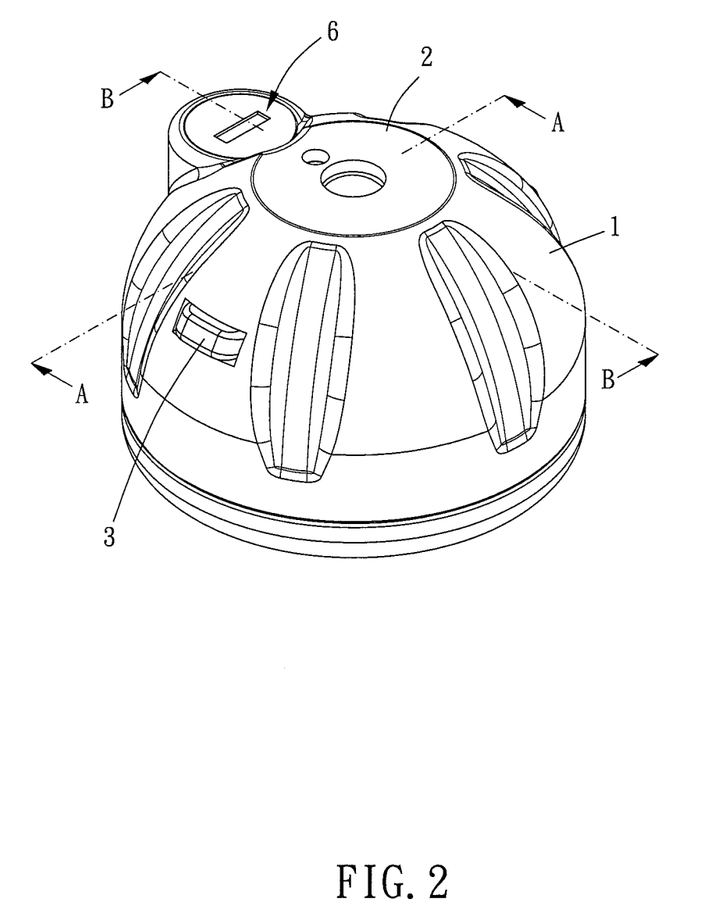
FIG. 2 is a stereogram of the present invention.
Figures 3, 13:
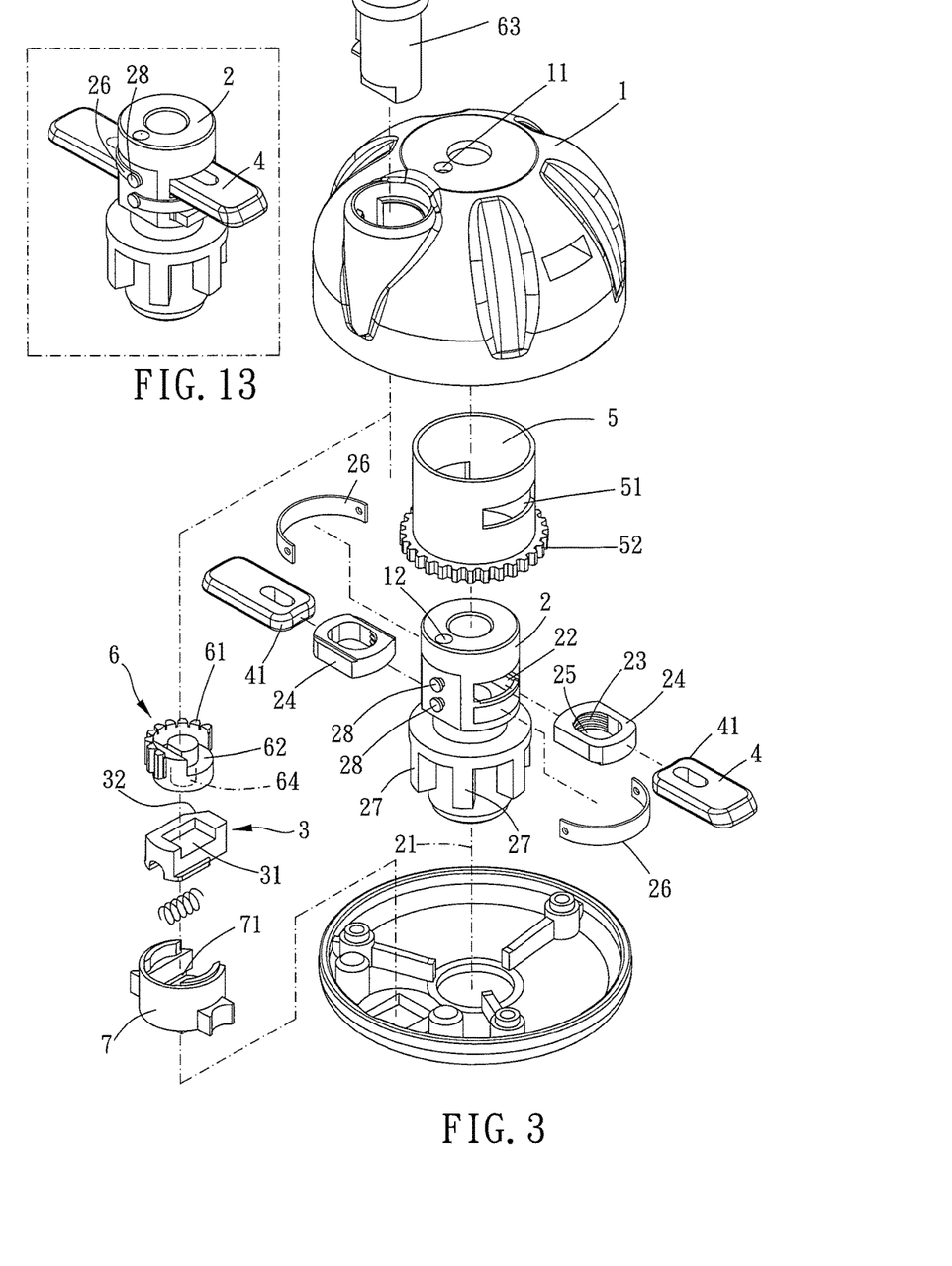
FIG. 3 is a breakdown drawing of the present invention.
FIG. 13 is a partial illustration of the present invention.
Figure 4:
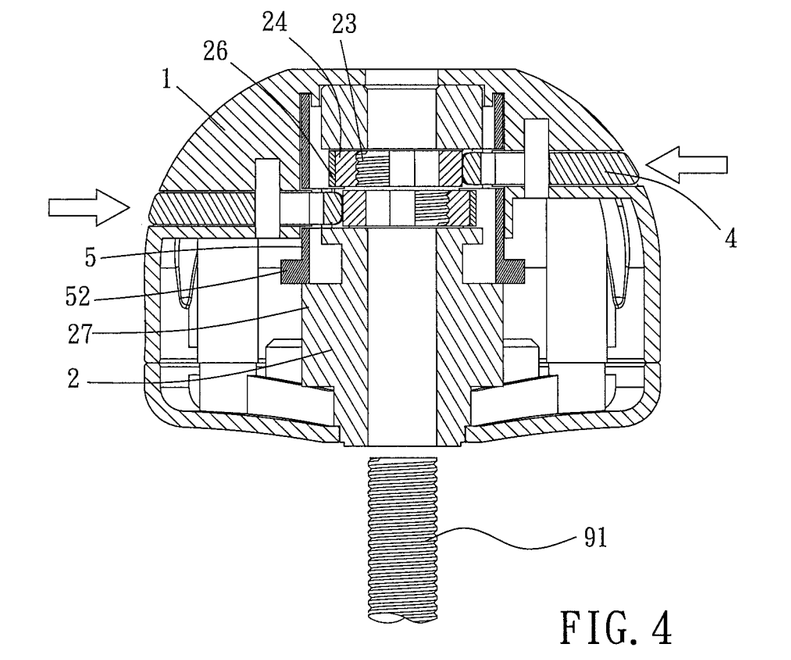
FIG. 4 and FIG. 5 are profiles of A-A during operation.
Figure 5:
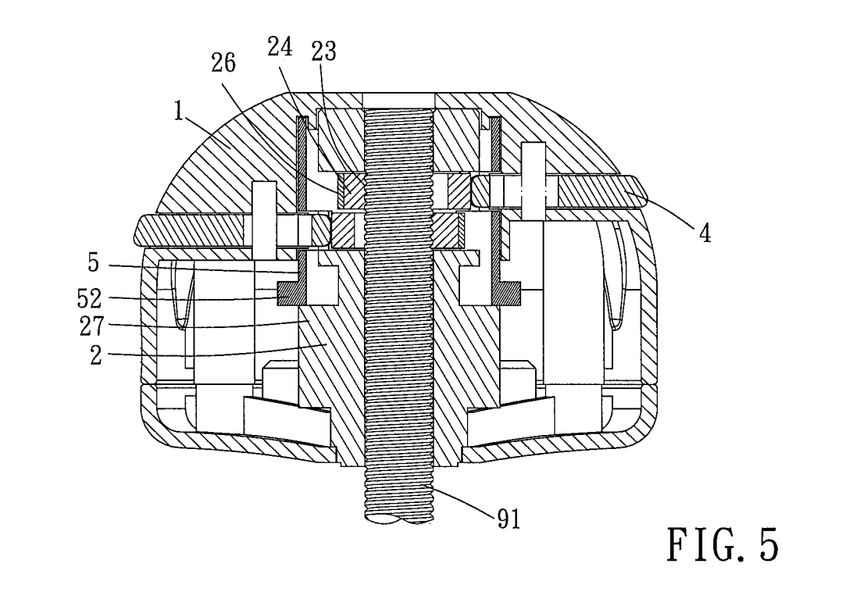
Figure 6:
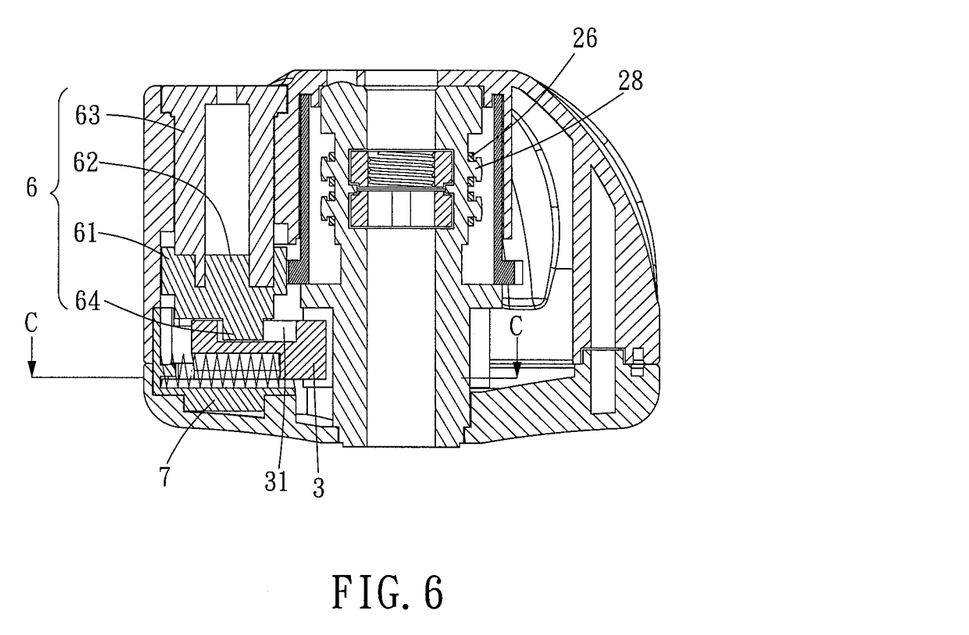
FIG. 6 is a profile of B-B.
Figure 7:
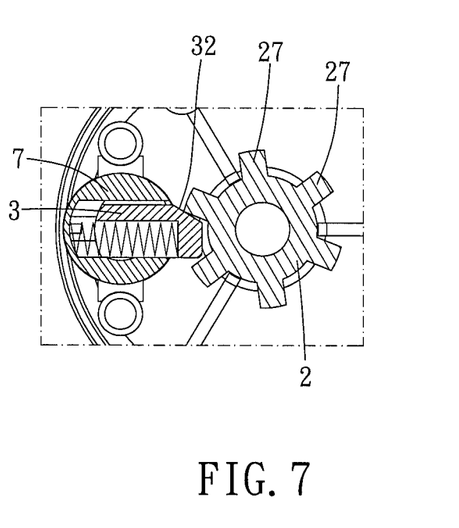
FIG. 7 and FIG. 8 are profiles of C-C during operation.
Figure 8:
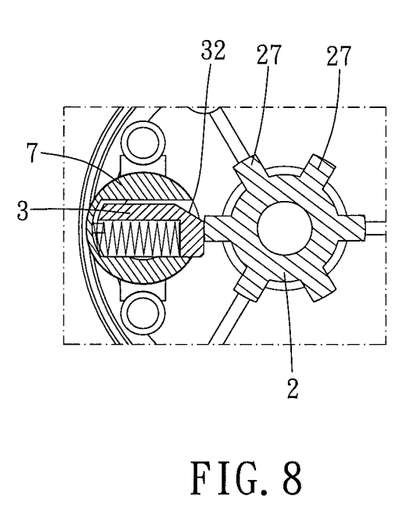
Figure 9:
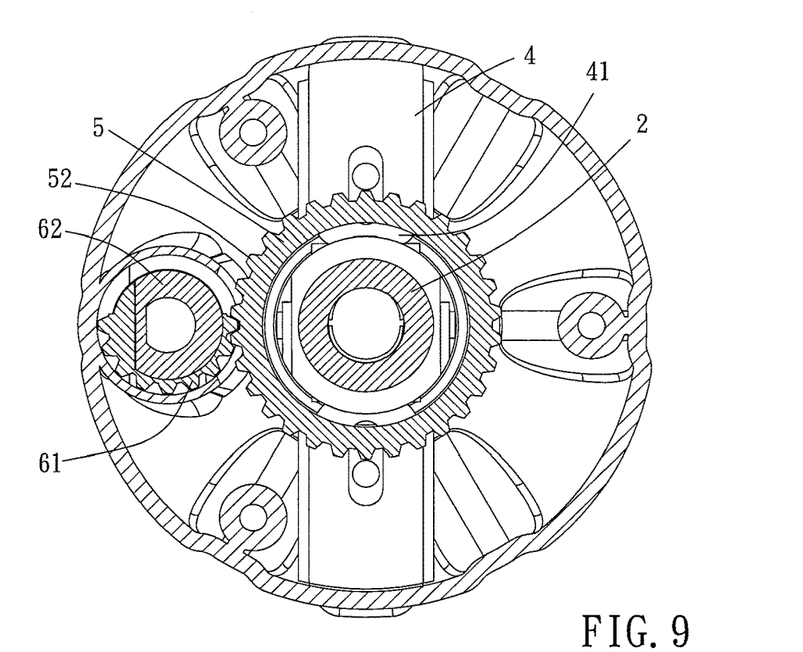
FIG. 9 and FIG. 10 are bottom view of the present invention.
Figure 10:
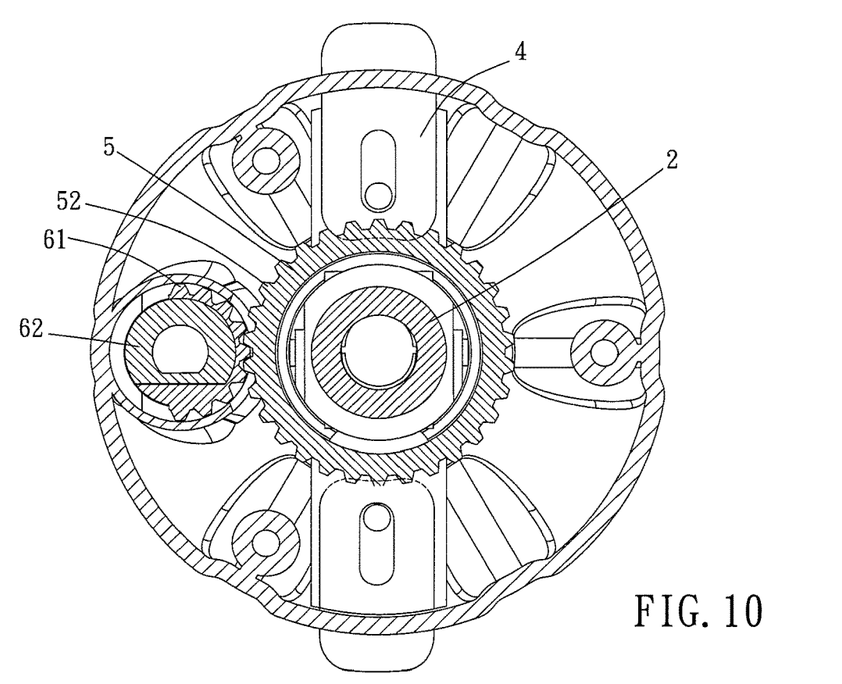
Figure 11:
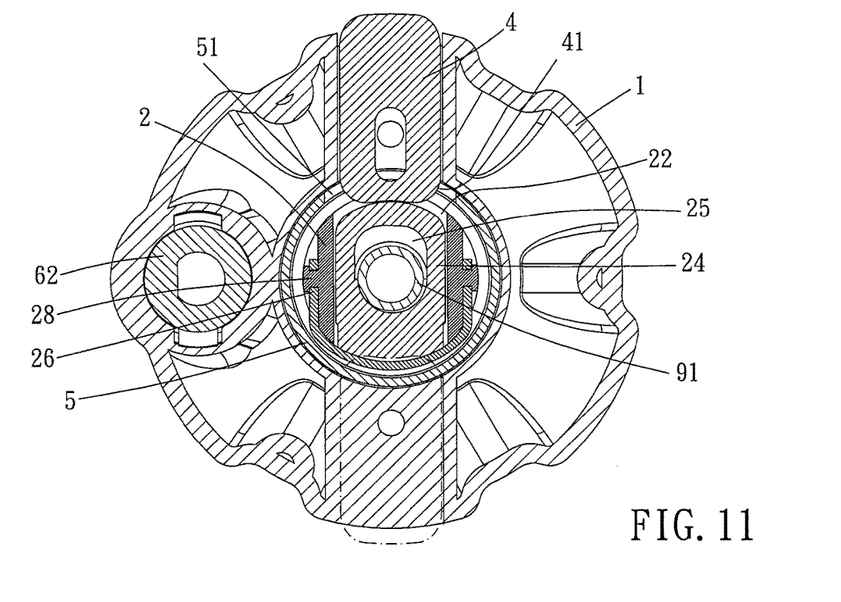
FIG. 11 is a profile of FIG. 9.
Figure 12:
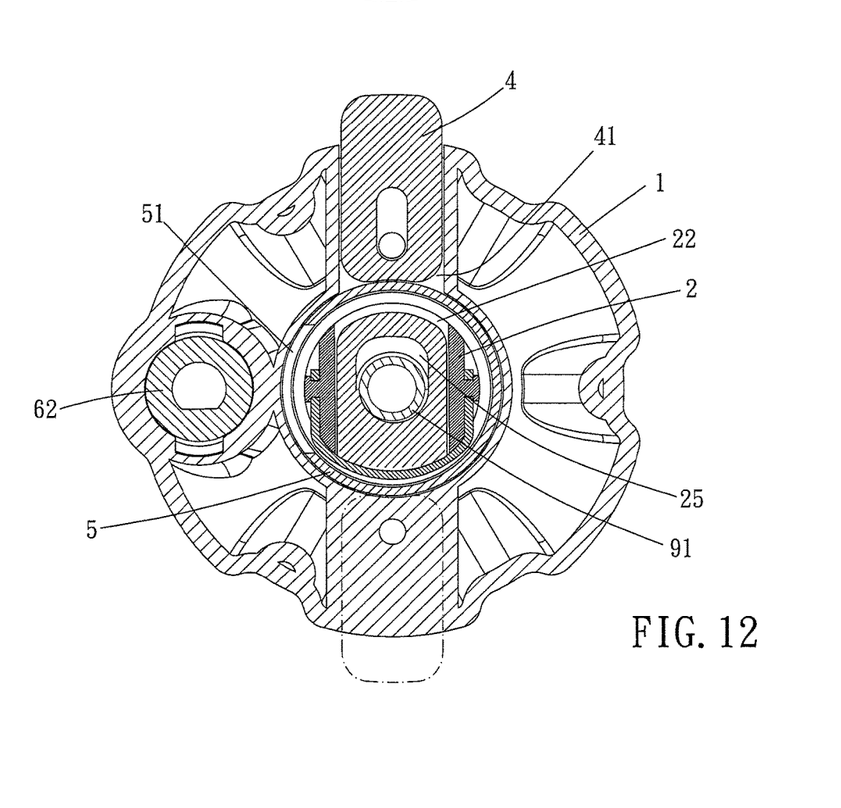
FIG. 12 is a profile of FIG. 10.

Preferably, the rotation member 2 is formed with two protruding pins 28 arranged vertically at each of two sides thereof. Each of the elastic members 26 is arc-shaped. One of the elastic members 26 is sleeved onto the two upper protruding pins 28 to surround half of a circumference of the rotation member 2. Another one of the elastic members 26 is sleeved onto the two lower protruding pins 28 to surround half of the circumference of the rotation member 2, as shown in FIG. 4, FIG. 5, and FIG. 13. Thus, the elastic members 26 may abut against the restriction members well.

As shown in FIG. 9 to FIG. 12, the spinning knob of the present invention further includes a sleeve member 5. The sleeve member 5 is rotatably sleeved onto the rotation member 2. The rotation member 2 is formed with at least one first through hole 22 extending radially. The sleeve member 5 is formed with at least one second through hole 51 extending radially. When the first through hole 22 overlaps the second through hole 51, the pressing member 4 is inserted through the first through hole 22 and the second through hole 51 to abut against the restriction member 24. When the sleeve member 5 rotates with respect to the rotation member 2, an edge of the second through hole 51 abuts against an arc section 41 on the pressing member 4 so as to move the pressing member 4 away from the rotation member 2 and to make the first through hole 22 stagger with the second through hole 51 so that the pressing member 4 is unable to enter the first through hole 22. Thus, the two threaded portions 23 abut against the screw 91 firmly.

Specifically, the sleeve member 5 is formed with a first toothed portion 52 extending radially and outwardly. The shell 1 is further disposed with a locking member 6. The locking member 6 is formed with a second toothed portion 61 extending radially and outward to be engaged with the first toothed portion 52. When the locking member 6 is rotated, the sleeve member 5 is rotated by the locking member 6 too. Preferably, the locking member 6 includes an engaging member 62 and a locking device 63 which rotate together. The second toothed portion 61 is formed on the engaging member 62. The locking device 63 is adapted for a key to insert in for operation. The engaging member 62 has an abutting member 64 which is protruded. The abutting member 64 abuts against a recess 31 of the pushing member 3. The pushing member 3 is slid toward the rotation member 2 or away from the rotation member 2 by rotating the engaging member 62. Thus, when inserting a key to rotate the locking device 63 and the engaging member 62, the abutting member 64 moves the pushing member 3 away from the rotation member 2. As a result, the pushing member 3 has no circumferential interference with the rotation member 2. If the shell is rotated, the shell rotates with respect to the rotation member 2, so rotation member 2 is fixed on the screw 91 and is unable to rotate. In addition, the two threaded portions 23 abut against the screw 91 and are unable to move away from each other, so the spinning knob cannot be removed so as to prevent the bicycle clamped by the bicycle carrier from being stolen.

Preferably, the shell 1 has an observation portion 11, and the rotation member 2 has a marking portion 12. When the pushing member 3 has circumferential interference with the rotation member 2, the observation portion 11 corresponds to the marking portion 12. Thus, the user can be informed without rotating the shell 1.

In conclusion, the spinning knob of the present invention can used to fasten the object but spins when the shell is continuously rotated. Thus, the threaded portions and the screw are prevented from abrasion to make them more durable.

What is claimed is:

1. A spinning knob, including:
   a shell;
   a rotation member, defining an axial direction, the rotation member being rotatably disposed on the shell along the axial direction, the rotation member including at least one threaded portion, the at least one threaded portion being adapted for screwing with a screw;
   a pushing member, arranged on the shell, the pushing member tending to abut against the rotation member along a radial direction to have circumferential interference with the rotation member so that the shell and the rotation member may rotate simultaneously;
   wherein the rotation member abuts against the pushing member along a direction oblique to the radial direction to make the pushing member trip away from the rotation member so that the pushing member has no circumferential interference with the rotation member and that the shell is rotatable with respect to the rotation member when the rotation member is screwed to the screw sufficiently, an end of the rotation member abuts against an object, and the shell is further rotated;
   wherein the rotation member has at least one restriction member disposed on the rotation member slidably along a radial direction, the at least one restriction member is movable between a screwing position and a release position, the at least one restriction member has the at least one threaded portion, one of elastic members is disposed on one of the rotation member and the shell to push the at least one restriction member so that the at least one restriction member tends to move toward the screwing position to make the at least one threaded portion abut against and screw with the screw, the at least one threaded portion does not abut against and screw with the screw when the at least one restriction member moves toward the release position.

2. The spinning knob of claim 1, further including at least one pressing member, the pressing member being slidably disposed on the shell, the pressing member corresponding to the at least one restriction member, the pressing member pushing the at least one restriction member to the release position when the pressing member is pressed toward the at least one restriction member.

3. The spinning knob of claim 2, including two said restriction member, each of the restriction members having a sleeve hole to sleeve onto the screw, each of the threaded portions being arranged on a side of an inner wall of the sleeve hole, the two restriction members being aligned vertically and staggered, the two threaded portions abutting against and screwing with the screw when each of the two restriction members moves toward the screw, the two threaded portions not abutting against the screw when each of the two restriction members moves away from the screw.

4. The spinning knob of claim 2, further including a sleeve member, the sleeve member being rotatably sleeved onto the rotation member, the rotation member being formed with at least one first through hole extending radially, the sleeve member being formed with at least one second through hole extending radially, when the first through hole overlaps the second through hole, the pressing member being inserted through the first through hole and the second through hole to abut against the at least one restriction member, when the sleeve member rotates with respect to the rotation member, an edge of the second through hole abutting against an arc section on the pressing member so as to move the pressing member away from the rotation member and to make the first through hole stagger with the second through hole so that the pressing member is unable to enter the first through hole.

5. The spinning knob of claim 4, wherein the sleeve member is formed with a first toothed portion extending radially and outwardly, the shell is further disposed with a locking member, the locking member is formed with a second toothed portion extending radially and outward to be engaged with the first toothed portion, when the locking member is rotated, the sleeve member is rotated by the locking member too.

6. The spinning knob of claim 5, wherein the locking member includes an engaging member and a locking device which rotate together, the second toothed portion is formed on the engaging member, the locking device is adapted for a key to insert in for operation, the engaging member has an abutting member which is protruded, the abutting member abuts against a recess of the pushing member, the pushing member is slid toward the rotation member or away from the rotation member by rotating the engaging member.

7. The spinning knob of claim 1, wherein the rotation member has a plurality of protrusions extending radially, the pushing member has circumferential interference with the rotation member between two adjacent said protrusions, the pushing member has an inclining face, when an end of the rotation member abuts against the object and the shell is rotated continuously, one of the protrusions abuts against the inclining face to move the pushing member away from the rotation member so that the pushing member has no circumferential interference with said protrusion.

8. The spinning knob of claim 1, further including a seat, the seat being fixed on the shell, the seat having a sliding groove, the pushing member being slidably disposed in the sliding groove.

9. The spinning knob of claim 3, further including a sleeve member, the sleeve member being rotatably sleeved onto the rotation member, the rotation member being formed with at least one first through hole extending radially, the sleeve member being formed with at least one second through hole extending radially, when the first through hole overlaps the second through hole, the pressing member being inserted through the first through hole and the second through hole to abut against one of the restriction members, when the sleeve member rotates with respect to the rotation member, an edge of the second through hole abutting against an arc section on the pressing member so as to move the pressing member away from the rotation member and to make the first through hole stagger with the second through hole so that the pressing member is unable to enter the first through hole, the sleeve member being formed with a first toothed portion extending radially and outwardly, the shell being further disposed with a locking member, the locking member being formed with a second toothed portion extending radially and outward to be engaged with the first toothed portion, when the locking member is rotated, the sleeve member being rotated by the locking member too, the locking member including an engaging member and a locking device which rotate together, the second toothed portion being formed on the engaging member, the locking device being adapted for a key to insert in for operation, the engaging member having an abutting member which is protruded, the abutting member abuts against a recess of the pushing member, the pushing member being slid toward the rotation member or away from the rotation member by rotating the engaging member, the rotation member having a plurality of protrusions extending radially, the pushing member having circumferential interference with the rotation member between two adjacent said protrusions, the pushing member having an inclining face, when an end of the rotation member abuts against the object and the shell is rotated continuously, one of the protrusions abutting against the inclining face to move the pushing member away from the rotation member so that the pushing member has no circumferential interference with said protrusion, the spinning knob further including a seat, the seat being fixed on the shell, the seat having a sliding groove, the pushing member being slidably disposed in the sliding groove.

10. The spinning knob of claim 9, wherein the rotation member is formed with two protruding pins arranged vertically at each of two sides thereof, each of the elastic members is arc-shaped, one of the elastic members is sleeved onto the two upper protruding pins to surround half of a circumference of the rotation member, another one of the elastic members is sleeved onto the two lower protruding pins to surround half of the circumference of the rotation member.

11. The spinning knob of claim 9, wherein the shell has an observation portion, the rotation member has a marking portion, when the pushing member has circumferential interference with the rotation member, the observation portion corresponds to the marking portion.

* * * * *